(12) United States Patent
Deluca et al.

(10) Patent No.: US 12,697,668 B2
(45) Date of Patent: Aug. 4, 2026

(54) DRILLING TOOLS AND INSERTS WITH COOLANT RELIEF AND METHOD

(71) Applicant: Allied Machine & Engineering Corporation, Dover, OH (US)

(72) Inventors: Salvatore D. Deluca, Cadiz, OH (US); Jason Ripple, Dover, OH (US); Cory L. Lawrence, Dover, OH (US)

(73) Assignee: ALLIED MACHINE & ENGINEERING CORP., Dover, OH (US)

( * ) Notice: Subject to any disclaimer, the term of this patent is extended or adjusted under 35 U.S.C. 154(b) by 571 days.

(21) Appl. No.: 18/099,672

(22) Filed: Jan. 20, 2023

(65) Prior Publication Data

US 2023/0226621 A1     Jul. 20, 2023

Related U.S. Application Data

(60) Provisional application No. 63/301,084, filed on Jan. 20, 2022.

(51) Int. Cl.
  *B23B 51/06*     (2006.01)
  *B23B 51/00*     (2006.01)
(52) U.S. Cl.
  CPC ...... *B23B 51/0686* (2022.01); *B23B 51/0007* (2022.01)
(58) Field of Classification Search
  CPC .......... B23B 2250/121; B23B 2251/12; B23B 2251/44; B23B 51/0682; B23B 51/068; B23B 51/06
  See application file for complete search history.

(56) References Cited

U.S. PATENT DOCUMENTS 3,667,857 A     6/1972  Shaner et al.
5,074,728 A     12/1991  Hsu
(Continued)

FOREIGN PATENT DOCUMENTS

CN        107486578      12/2017
DE        19807429       8/1999
(Continued)

OTHER PUBLICATIONS

Federal Service on Intellectual Property, Federal State Budgetary Enterprise Federal Institute of Industrial Property (FIPS), Search Report, Jun. 28, 2023, 2 pages, Moscow, Russian Federation.
(Continued)

*Primary Examiner* — Alan Snyder
(74) *Attorney, Agent, or Firm* — Hahn Loeser & Parks LLP

(57)     ABSTRACT

There is provided a drill insert for drilling metallic or other materials, comprising a drill insert body with first and second lands at the outside diameter of the body that interface with the wall of a drilled hole. There is provided a coolant relief arrangement at the outside diameter of the drill insert by a plurality of coolant supply channels extending between the leading edge and trailing edge of the interface, to provide coolant relief to the outside diameter of the drill insert at the interface with the drilled hole. The drill inserts of the invention provide reduced friction and heat generation while maintaining high stability, and operate to prevent accumulation of materials on surfaces of the drill inserts at the outside diameter of the drill insert. This enables higher penetration rates and operating speeds while maintaining integrity of the drill inserts.

20 Claims, 8 Drawing Sheets

(56)     References Cited

U.S. PATENT DOCUMENTS

| | | | |
|---|---|---|---|
| 5,503,237 | A | 4/1996 | Neukirchen |
| 8,215,878 | B2 | 7/2012 | Rozzi et al. |
| 9,346,103 | B2 | 5/2016 | Luik et al. |
| 9,539,653 | B2 | 1/2017 | Rogalla et al. |
| 2008/0199268 | A1 | 8/2008 | Krenzer et al. |
| 2009/0277691 | A1 | 11/2009 | Geier et al. |
| 2015/0314378 | A1 | 11/2015 | Rogalla et al. |
| 2018/0221967 | A1 | 8/2018 | McKinley et al. |
| 2019/0232383 | A1 | 8/2019 | Nakata |
| 2019/0351490 | A1 | 11/2019 | Brohede et al. |
| 2020/0038971 | A1 | 2/2020 | Mckinley et al. |
| 2021/0260670 | A1 | 8/2021 | Naito et al. |
| 2022/0241873 | A1* | 8/2022 | Arai ........................ B23B 51/02 |

FOREIGN PATENT DOCUMENTS

| | | |
|---|---|---|
| DE | 10 2008 022 945 | 12/2009 |
| EP | 3372330 | 9/2018 |
| FR | 1274316 | 10/1961 |
| FR | 3074435 | 6/2019 |
| JP | 2007075942 | 3/2007 |
| RU | 2156180 | 9/2000 |
| SU | 1155369 | 5/1985 |
| WO | 9835777 | 8/1998 |
| WO | 2018162185 | 9/2018 |
| WO | 2019110452 | 6/2019 |
| WO | 2019201962 | 10/2019 |

OTHER PUBLICATIONS

European Patent Office, Extended European Search Report, Jun. 19, 2023, 7 pages, Birmingham, West Midlands, Royaume UNI.

* cited by examiner

FIG. 7
FIG. 8
FIG. 9
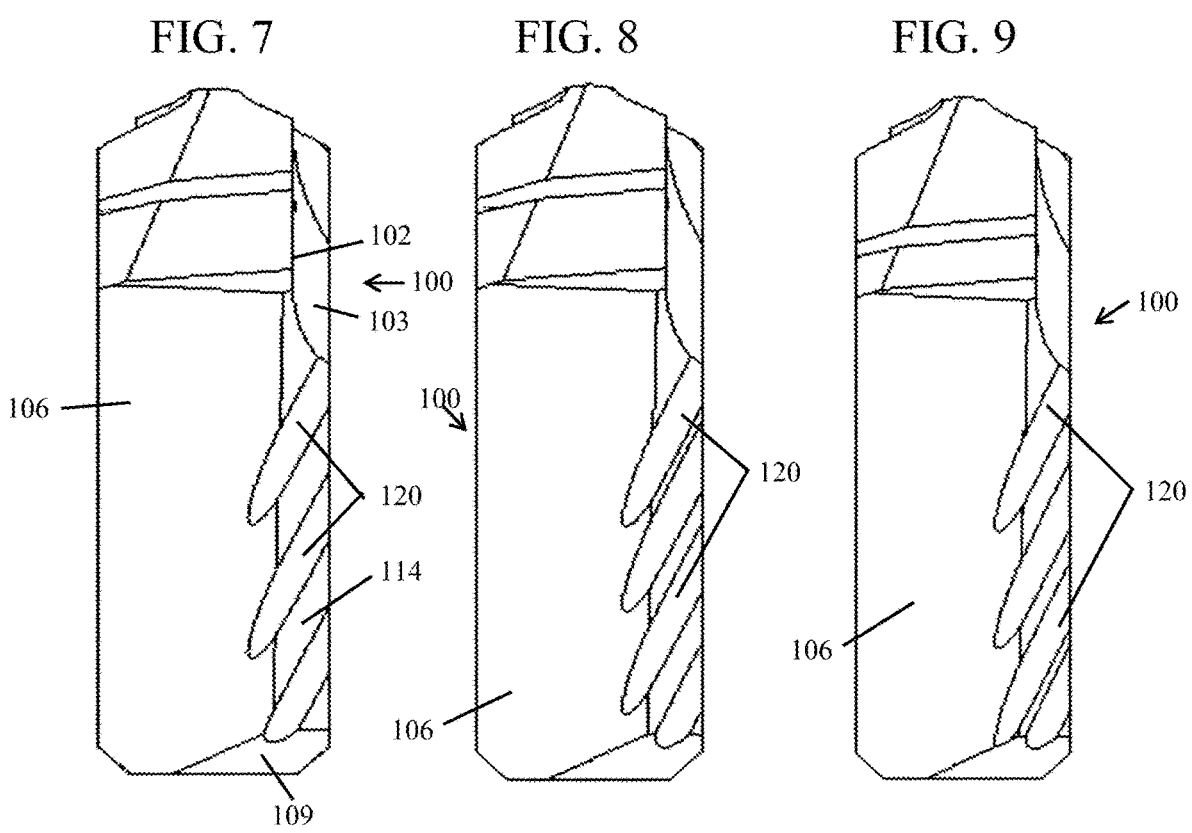
FIG. 4B
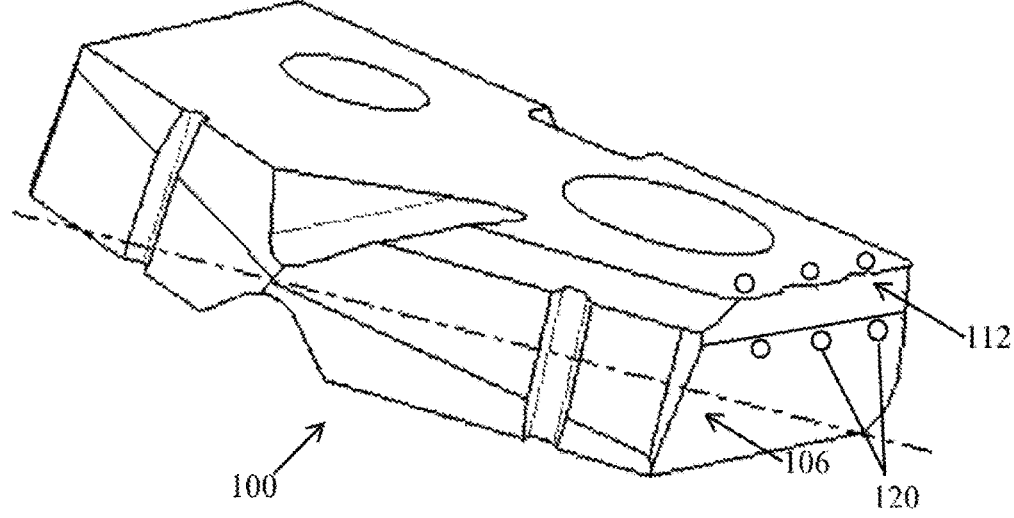

FIG. 10
FIG. 11
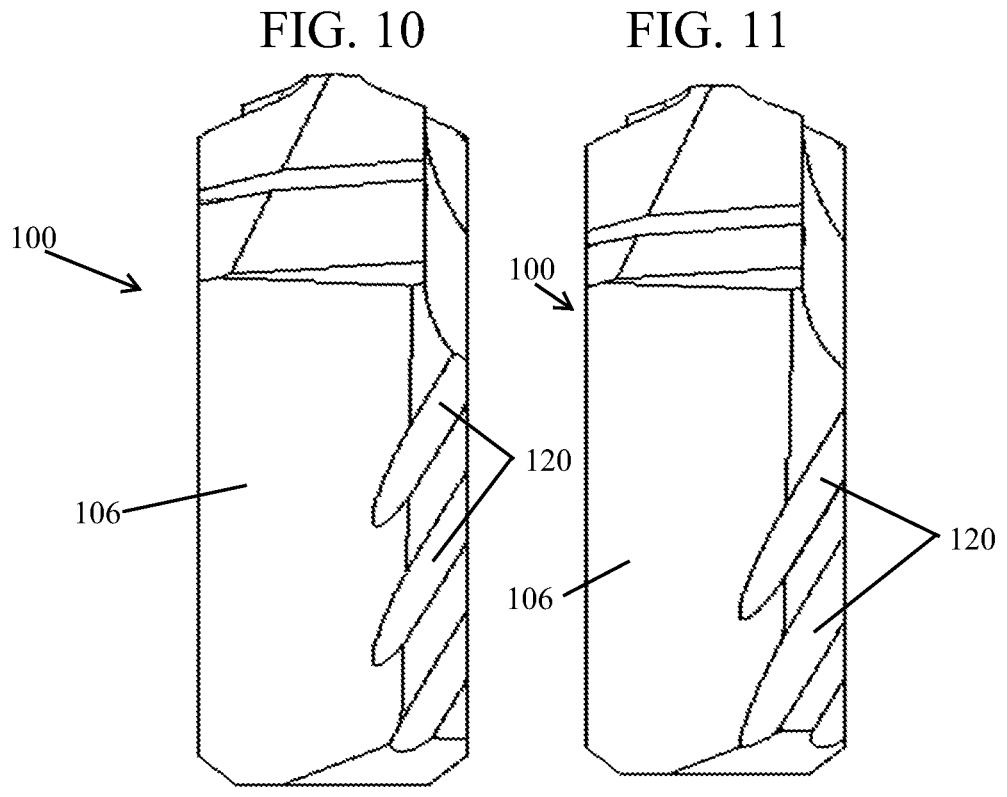
FIG. 12
FIG. 13
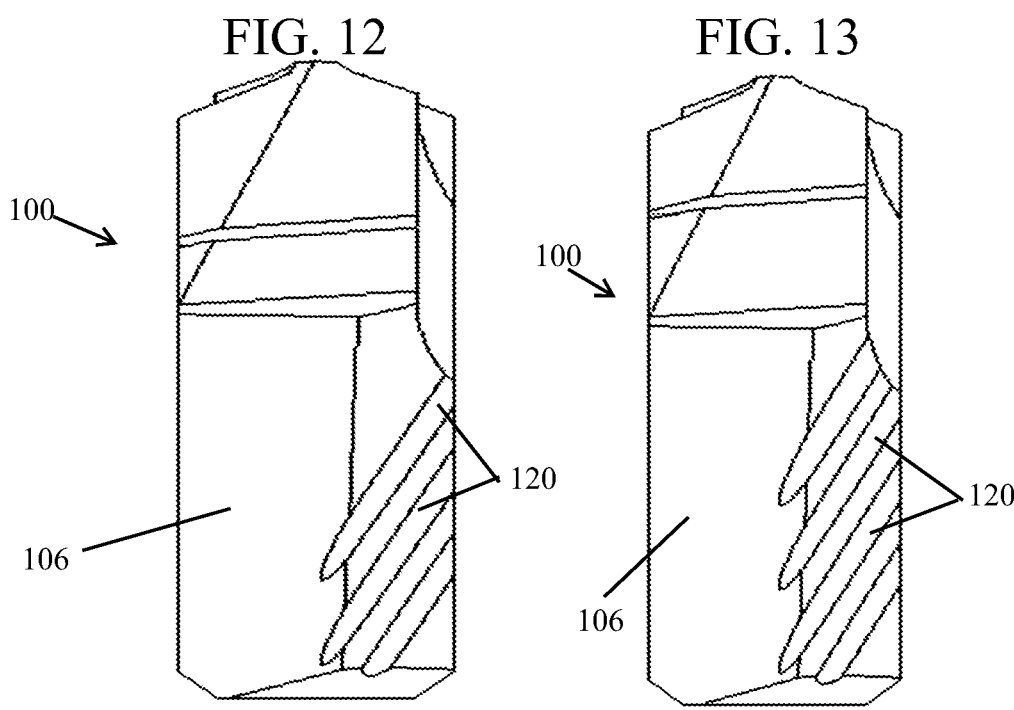

DRILLING TOOLS AND INSERTS WITH COOLANT RELIEF AND METHOD

CROSS REFERENCE TO RELATED APPLICATION

This application is a Non-Provisional patent application, which claims priority to and the benefit of U.S. Provisional Patent Application Ser. No. 63/301,084, filed on Jan. 20, 2022, which is hereby incorporated by reference.

TECHNICAL FIELD

The present invention relates to drill inserts and drill tool assemblies and methods for drilling metallic or other materials, to provide improved performance in the machining of different types of modern materials used in the manufacture of goods. The drilling tools may include drill inserts with coolant relief and flushing at the outside diameter of the drill insert at and/or adjacent the interface with the drilled hole.

BACKGROUND OF THE INVENTION

In the machining of holes into metallic materials, it has been customary to employ solid twist drills or spade drill inserts. With reference to FIGS. 1-3, a prior spade drill insert 10 is constructed as a flat, generally rectangular plate of hard material such as tungsten carbide that is imparted with a point and cutting edges 12 on its forward side. The outside edges 14 that define the outside diameter of the drill insert 10 form an interface with the side of the drilled hole. The spade drill insert 10 is assembled into a holder 20 with a front end for receiving the spade drill insert 10. As seen in FIG. 2, the holder 20 may have a straight flute 22 on each side associated with two cutting edges 12 of the drill insert 10, or helical flutes associated with the cutting edges. The flutes 22 evacuate chips after being formed at the cutting edges in conjunction with a coolant fluid supplied to the forward end of the holder 20 via a through tool coolant supply and outlets 24. The coolant fluid may be a liquid coolant that facilitates removal of chips after being formed and segmented by the cutting geometry. As the drill insert 10 becomes worn from use, the drill insert can be quickly and economically replaced with another drill insert 10. In many applications, this is preferable to conventional twist drills which are either expensive to replace or must be re-sharpened through a time-consuming process. Inserts are also used in other cutting tools for machining of workpieces, such as in turning, boring, planing, shaping, machining, and reaming processes for example, and similar problems may be encountered in such applications.

In the metal drilling industry, coolant is used to achieve better tool performance. Using coolant provides lubricity, heat dissipation from the tool, and aids in chip evacuation. This results in a tool that can operate faster and achieve longer tool life. Though the use of coolant in drilling products to various industries is typical, a need still exists in the drilling tool industry for an improved coolant delivery method that provides coolant relief to certain areas of the tool where problems such as heat generation, material build up or other problems can occur. Though such prior drill inserts are functional, the interface areas at the land surfaces 14 at the outside diameter of the drill insert 10 are susceptible to the generation of significant heat and friction, which in turn can cause adhesion of materials, such as swarf or fines, to the surfaces adjacent the interfaces during the drilling process. As seen in FIG. 3, material 30 can adhere and accumulate adjacent the interface at the outside diameter 14 of the drill insert 10, leading to degradation of performance in the drilling operation. The problem of adhesion of cut materials at these locations on the drill insert 10 is exacerbated by modern materials used in the manufacture of products, which are designed with a variety of properties for attaining particular performance characteristics. Such materials may create undesirable heat, friction and/or adhesion, as seen in FIG. 3. These undesirable effects are amplified by the increasing desire to drill holes faster in high production environments. There is therefore a need to alleviate the problems associated with the outside diameter of the drill insert that are encountered in many applications and with different materials.

SUMMARY OF THE INVENTION

The invention is therefore directed to a drill insert and drilling tool assembly which achieves the beneficial effects of minimizing undesirable heat, friction and adhesion of materials in the region of the outside diameter of the drill insert in tools of this type. The invention according to an example provides a drilling tool assembly with a drill insert for producing holes, but the drill inserts configuration of examples may be used in other "drill inserts" used in other machining operations. The drill inserts comprise a drill insert body, which may have a first end opposite a second end, first and second side locating surfaces and a first land surface opposite a second land surface at the outside diameter of the body. The first end of the drill insert body has cutting edges associated therewith, and the first and second locating surfaces together locating the drill insert with respect to a drill insert holder and chip evacuating flutes associated with the drill insert holder. The first and second lands have leading and trailing edges and form an interface with the side of a drilled hole or other surface during machining of a workpiece. The first and second lands include at least one coolant supply channel extending between the leading and trailing edges of the interfaces to allow coolant fluid to flow adjacent the trailing edge of the interfaces at the first and second lands and outside diameter of the drill insert. A plurality of spaced apart coolant supply channels along the interfaces of the drill insert may be used.

In another example, the drilling tool assembly includes a drill insert comprising a body with a rotational axis, a bottom surface, first and second side surfaces and a front surface and at least two outside surfaces forming the outside diameter of the body and defining the interfaces between the body and side of the hole being drilled. There are provided cutting edges associated with the front surface extending from the rotational axis of the body to the at least two outside surfaces. Each of the at least two outside surfaces has at least one or a plurality of coolant supply channels in the body extending laterally through the interface of the at least two outside surfaces with the side of the hole. The coolant supply channels are arranged at an orientation angle for coolant to enter from the bottom of the drilled hole and be dispersed in the area adjacent the trailing side of the interfaces.

The drill insert mates with a holder having a rotational axis and first and second clamp arms which may form a mounting slot for example, to which the locating surfaces of the drill insert are attached. A through tool coolant supply associated with the holder, to supply coolant at the forward end of the holder adjacent the drill insert. Chips formed by the cutting edges are moved by the coolant to a flute in the holder for evacuation. The drill insert may include a flute portion mating with the flutes in the holder. The one or more coolant supply channels formed with respect to each outside diameter interface of the drill insert are arranged to remove materials that may otherwise adhere to the surfaces adjacent the interfaces of the drill insert with the side of the formed hole, and dissipate heat and friction at the interfaces. By reducing heat, friction, and adhesion, the arrangement allows for enhanced performance at higher speeds over prior drill designs. The drill inserts provide reduced friction and heat generation while maintaining high stability and preventing accumulation of materials on surfaces of the drill inserts that degrades operation. This enables higher penetration rates and operating speeds while maintaining integrity of the drill inserts. These beneficial effects are provided by the use of at least one coolant relief structure at the outside diameter that allows coolant from the leading edge of the flute to be directed through the interface or surface contact area of the outside diameter of the drill insert with the wall of the hole as it is drilled. The arrangement allows coolant entry from the leading edge of the flute used to remove chips to be dispersed at the trailing edge of the interface. In examples, the arrangement may also break up the surface contact area of the interface at the outside diameter with the hole wall to further reduce friction and heat. At the same time, the arrangement maintains at least substantial linear contact area throughout the entire interface region for high stability during drilling.

The invention also provides a method of delivering coolant to the area of the interfaces between a drill insert and the wall of the drilled hole in a drilling operation. A drilling tool assembly comprising a holder having first and second ends and a rotational axis, and a drill insert with cutting edges mounted in the holder, the drill insert has at least two interfaces engaging the wall of the drilled hole. At least one coolant supply channel extends through each of the at least two interfaces with the wall of the hole. The drill insert is rotated to cut a hole in a workpiece, with coolant supplied under pressure toward the bottom of the hole with the at least one coolant supply channel arranged to allow coolant to flow through the interfaces to the areas adjacent the trailing edge of the interfaces at the outside diameter of the drill insert.

The above improvements and advantages along with other objects and advantages of the present invention will become readily apparent from a reading of the description of various examples taken in conjunction with the drawings and the claims.

BRIEF DESCRIPTION OF THE DRAWINGS

The invention and characteristics thereof are described in more detail in the following by way of examples with reference to the drawings, in which:

FIG. 4B is a view of the drill insert according to a first example of the invention.

FIG. 7 is a side view of another example of a drill insert according to the invention.

FIG. 8 is a side view of another example of a drill insert according to the invention.

FIG. 9 is a side view of another example of a drill insert according to the invention.

FIGS. 10 and 11 are side views of opposing land surfaces on the drill insert according to another example of the invention.

FIGS. 12 and 13 are side views of opposing land surfaces on the drill insert according to another example of the invention.

DESCRIPTION OF THE INVENTION

Figure 3:
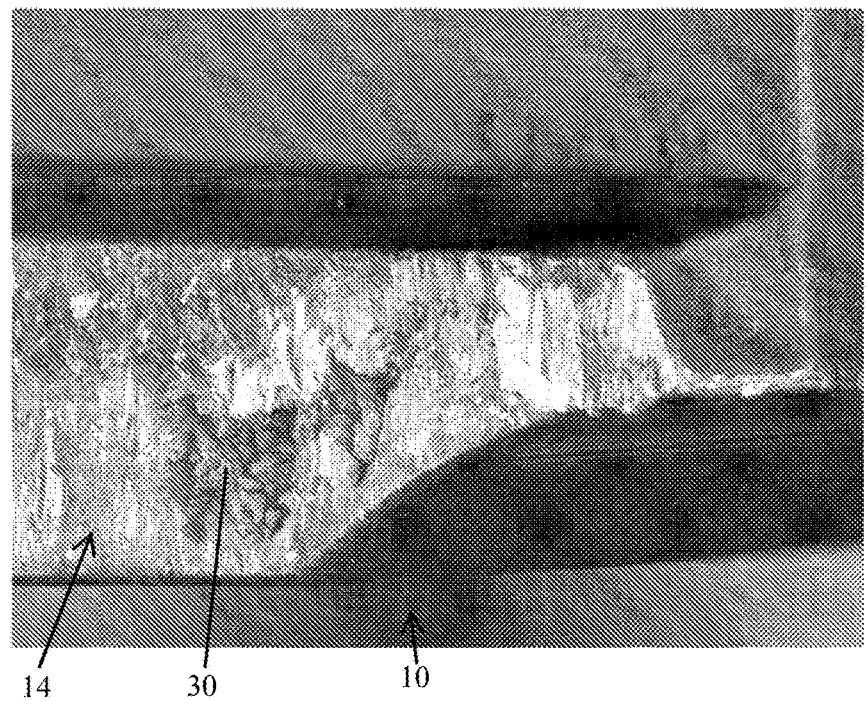
FIG. 3 is an image of the outside diameter of a drill insert such as shown in FIG. 1 after use in forming a hole in a metal workpiece.

Turning now to examples of the invention, it will be noted that the coolant supply configurations provide distinct advantages in association with drilling tools used for hole making. Known coolant configurations for drills may include through coolant drills that are designed with coolant exiting from the drill insert holder adjacent the cutting edges of the drill insert toward the bottom of the drilled hole. Though the coolant flows from the bottom of the hole toward the flutes of the holder, the outside diameter of the drill insert is not supplied with coolant to alleviate heat and friction at the interfaces of the drill insert with the wall of the drilled hole, and materials can adhere to the drill insert as noted with respect to FIG. 3 above. In the examples of the invention, the arrangement of coolant relief structure at the interfaces, such as coolant supply channels, creates a superior coolant dissipation to better target the entire area of the interfaces at the outside diameter of the drill insert and reduce friction and heat build up or adhesion of materials to the drill insert at these locations. The examples are directed to improved coolant delivery systems and methods to enhance drilling performance.

Figure 4A:
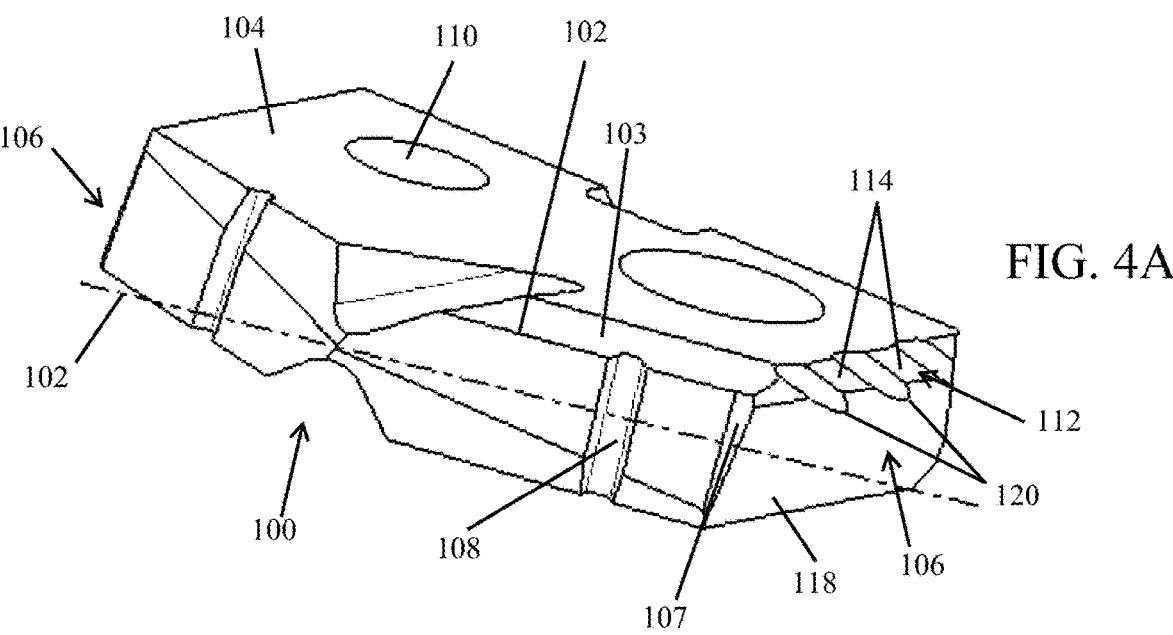
FIG. 4A is a view of the drill insert according to a first example of the invention.
Figure 5:
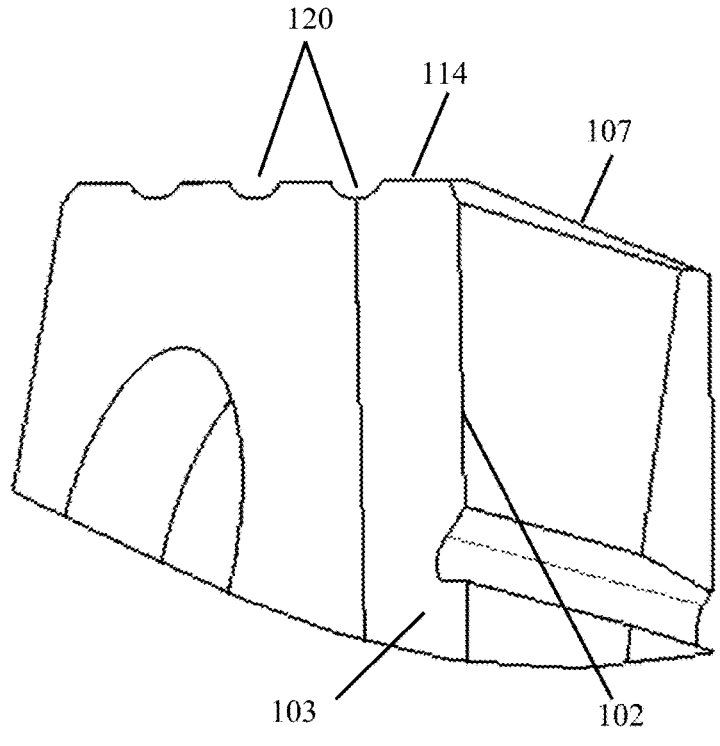
FIG. 5 is a partial view of the drill insert of the example of FIG. 4A.

Turning to FIGS. 4-5, there is illustrated a first example of a drill insert assembly generally indicated at 100. The drill insert 100 is configured to be positioned in a holder, such as similarly to as noted with respect to FIG. 2 for example, with the holder having a clamping or locating slot into which the drill insert 100 is positioned and attached. The drill insert 100 is precisely positioned with respect to the holder to perform the desired drilling function in conjunction with the holder, and allows replacement of the drill insert 100 when worn. The drill insert 100 has a double effective drilling geometry with a point geometry comprising a plurality of cutting edges 102 which are precisely positioned with respect to the rotational axis of the holder to minimize errors in a resulting drilling operation.

Figure 1:
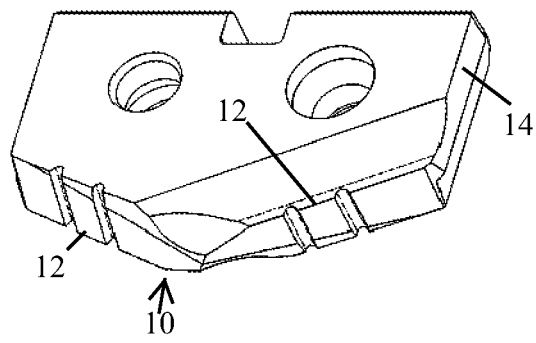
FIG. 1 is a view of a prior art drill insert.
Figure 2:
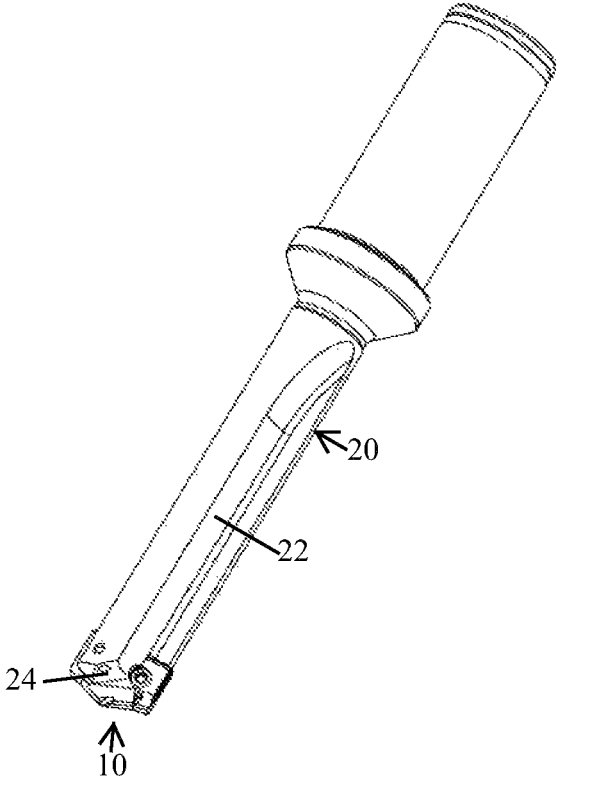
FIG. 2 is a view of the prior art drill insert of FIG. 1 in a holder.

The drill insert 100 may be in the form a spade drill blade, with cutting edges 102 at the front end and side locating surfaces 104 of the blade being generally parallel with the rotational axis of a holder, such as shown in FIG. 2, once the drill insert 100 is positioned and secured therewith. The drill insert 100 has a thickness, and includes at least two land surfaces 106 with at least a portion that engages the wall of a drilled hole during drilling. The at least two cutting edges 102 on drill insert 100 extend from the axial center to the outside diameter at lands 106. The cutting edges 102 may include a plurality of drilling sections, may be straight or curved, and may include chip breakers 108 or other structures to segment and create smaller chips in association with the cutting edges 102. The cutting edges provide double effective cutting of the material when rotationally driven in conjunction with a holder. The mounting holes 110 allow connection to clamp arms of a holder for example, to suitably locate the drill insert 100 with respect to the holder.

In this example, a coolant relief arrangement is provided in association with the at least two land surfaces 106 to allow the application and flow of lubricating coolant directly to the areas adjacent the interface between the land surfaces 106 and the wall of the drilled hole or machined surface. Each land surface 106 defines an interface with the wall of the drilled hole, which as noted, is subject to friction and heat generation, as well as possible adhesion of cut materials at the areas adjacent the interface of land surfaces 106. In the example of FIGS. 4A and 5, the land surfaces 106 include margins 112 that define the interface with the side of the drilled hole. The land surfaces 106 may also be configured without a margin, with an interface with the hole being drilled created by a portion of the land surfaces 106. In the example of FIGS. 4A and 5, each land surface 106 and in this example margin 112 includes at least one or a plurality of coolant supply channels, which in this example are relief areas or grooves 120 that interrupt the interface of land surface 106 or margin 112 with the wall of the drilled hole. Alternately, as seen in FIG. 4B, the coolant supply channels 120 may be holes formed adjacent the interface of the land surfaces 106 or margin 112 with the side of the drilled hole. The plurality of coolant supply channels 120 are spaced apart along the margin 112, and oriented transversely to the margins 112 to extend through the margin 112 at the outside diameter of the drill insert 100.

In the example of FIGS. 4A and 5, the plurality of grooves 120 are open on each end to the leading edge and trailing edge of the flutes associated with the system, such as in the drill insert 100 and/or holder it is mounted in. The open ends of the plurality of grooves 120 allow for coolant to enter and flow through the grooves 120 during the drilling cycle, thus providing enhanced cooling and lubrication at the area of the interface of each land 106. The lands 106 or margins 112 have clearance behind the interfaces, and the high velocity flow of coolant through the plurality of coolant supply channels 120 effectively disperse any cutting materials that may otherwise tend to adhere in the areas adjacent the trailing end of the interface and this clearance surface. This is particularly the case for materials such as austenitic stainless steels, low carbon steels or other steels or materials that may otherwise tend to adhere and build up on areas of the drill insert. The arrangement of this example, using numerous small coolant supply channels 120 as grooves throughout the region of the outside diameter creates multiple margin contact areas 114 spaced across the entire region of the outside diameter for improved heat dissipation while maintaining drill stability. For various applications or materials, the percentage of the margin 112 that is relieved by the plurality of grooves 120 may be between 30 to 70% of the total margin area. The size and location of the plurality of coolant supply channels 120 are defined in a way to allow and promote coolant flow therethrough while blocking swarf entry into the region. This is provided by arranging the plurality of coolant supply channels 120 at a transverse angle that promotes dispersion of coolant as desired while minimizing the ability for swarf or fines from entering as the size of the coolant supply channels at the interface is very small. The plurality of grooves 120 may be formed as a radius with upper edges at an obtuse angle related to the outside diameter, or in another suitable shape or configuration. Alternatively, the coolant supply channels could be formed as holes as in FIG. 4B extending through the drill insert body adjacent the interface at margins 112. The holes could extend through the interface from the leading to trailing edge of the interface, with the interface or margin 112 uninterrupted to maintain stability of the interface or margin while dispersing coolant to the trailing edge to provide the desired benefits. Other alternate coolant supply channels such as holes and/or grooves may be positioned to direct coolant to particular areas of land 106 and area adjacent the interface as may be desired, and different configurations of coolant supply channels could be used together.

In the example of FIGS. 4A and 5, the plurality of coolant supply channels 120 extend through the margin 112 to open adjacent the relief surface 118 on the land surface 106. A first groove 120 is positioned in predetermined spaced relation to the cutting edges 102, such as at the interface of the cutting lip surface 103 formed below the cutting edges 102 with the margin 112. This arrangement leaves enough margin surface 114 at the location adjacent the cutting edges 102, to maintain stability during drilling, while allowing the flow of coolant in this region of the interface of interface or margin 112 with the wall of the drilled hole. In this example, the upper margin portion 114 adjacent the cutting edges 102 is dimensioned to be larger than the margin areas 114 between the grooves 120 along the margin 112 from the cutting edges 102, but the spacing of coolant supply channels 120 and margin areas 114 may be of different dimensions and be uniform or non-uniform. This location nearest the cutting edges 102 is susceptible to the possible adhesion of materials due to the proximity to the cutting edges 102, and the positioning of the coolant supply channel 120 to disperse coolant at this location facilitates preventing such adhesion. The first or upper groove 120 may therefore be particularly positioned to line up with the intersection of the back side of the cutting lip 103 and the thickness of the drill insert to prevent adhesion of materials in this area while still providing sufficient stability during drilling. Generally, the distance between the first groove 120 from the cutting edge 102, which may include a corner clip 107 associated with the outside corner of the cutting edge, be at least about 0.005", but this distance may vary depending on material or application for example. A distance of between 0.025" and 0.050" may provide additional margin stability in the region closest to the cutting edge 102 for many applications. The coolant supply channel at this position could also be formed as a hole rather than a groove to facilitate margin stability. The distance or spacing between the first of the plurality of coolant supply channels from an adjacent coolant supply channel 120 is generally less than the distance from the cutting edge 102 to the first coolant supply channel 120, but may be greater.

In this example, after positioning the first coolant supply channel 120 in the desired position in relation to the cutting edge 102 and portion of the margin 112 adjacent the cutting edges 102, additional coolant supply channels 120 are provided in spaced relation to the first coolant supply channels along the length of the margin 112. In this example, the remaining margin areas 114 between the grooves 120 are sized to minimize undesirable heat, friction, and resulting increased wear of the margin areas 114 while maintaining stability of the tool during drilling. This allows higher penetration rates to be achieved in the drilling operation. The spacing between grooves 120 is at least 0.005", but can be increased based on the size of the drill insert and/or materials or applications in which the drill insert 100 is used. For example, the spacing between coolant supply channels 120 may be in the range of 0.010" to 0.025", but different spacing may be used and the spacing may be varied between individual coolant supply channels 120.

Figure 6:
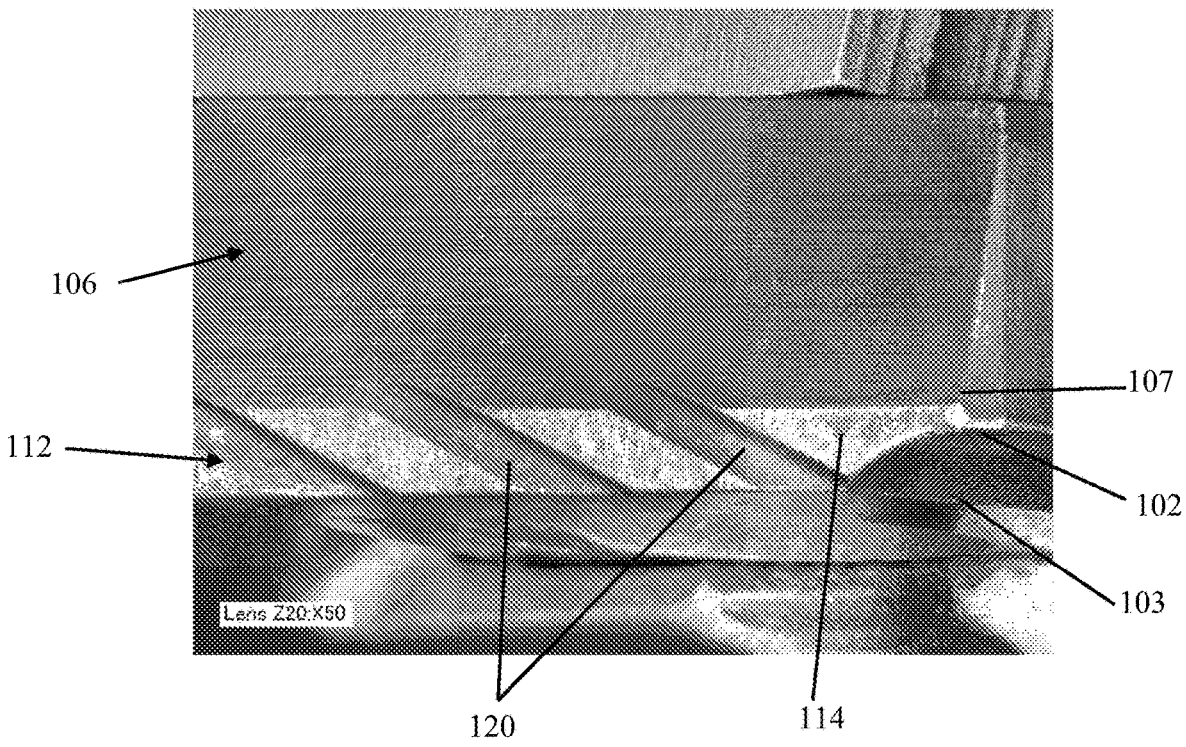
FIG. 6 is an image of the outside diameter of a drill insert such as shown in the example of FIG. 4A after use in forming a hole in a metal workpiece.

The coolant outlets in a holder (such as in FIG. 2) provide coolant directed at the bottom of the hole which then is directed out of the hole via the flutes of the holder (or drill insert if provided with flute portions) associated with each cutting edge 102 to facilitate chip removal. The arrangement of the plurality of coolant supply channels 120 allow flow of some coolant through the interface at the margins 112 by the force of the coolant after hitting the bottom of the hole and due to the rotation of the drill insert 100 during drilling. This dispersal of coolant at the outside diameter disrupts or dislodges particles from adhering to the drill insert surfaces adjacent the margin interfaces. The orientation of the plurality of coolant supply channels 120 is at an angle to promote the dispersion of coolant in the areas adjacent the interfaces and through the interfaces. As seen in FIG. 6, the arrangement of the plurality of coolant supply channels 120 substantially prevents adhesion of materials in the area of the margin interface on drill insert 100.

The number and position of coolant supply channels 120 at the interface of margin 112 can vary depending on size of the drill insert, materials being drilled or particular application as may be desired, and coolant supply channels 120 can be uniformly or non-uniformly spaced along the length of the margin 112 as shown in FIG. 7. As seen in this example, the coolant supply channels extend between the leading edge of the margin 112 and through the trailing edge at an orientation angle relative to the plane of the margin 112. The lowermost groove 120 may extend between the leading edge of margin 112 and bottom locating surface 109 of the drill insert 100. Alternatively, the spacing of coolant supply channels 120 may be increased from the front end of the margin 112 as seen in FIG. 8, or decreased from the front end of the margin 112 as seen in FIG. 9. The spacing of coolant supply channels 120 may also differ from one land 106 to the other as shown in FIGS. 10 and 11, which show the opposing lands 106 of a drill insert 100. Further, the number of coolant supply channels 120 can vary depending on the length of the margin 112 or cutting lip 103 of drill insert 100. As seen in FIGS. 12 and 13 which shows the opposing land surfaces 106 of a drill insert 100 for example, the number of coolant supply channels 120 can also vary from one land surface 106 to the other. The ability to position the coolant supply channels 120 in relation to the interfaces on each land 106 and one another in these various arrangements enable optimizing performance for use with a particular material or in a particular application, by controlling the flow of coolant from the leading edge to the trailing edge of the margin 112 in relation to the cutting edges 102 and bottom of the hole. The dispersal of coolant across the interface of margins 112 in a desired manner minimizes friction and heat generation and flushes any materials to prevent adhesion to the surfaces at the outside diameter of the drill insert 100.

Figures 14, 15, 16, 17:
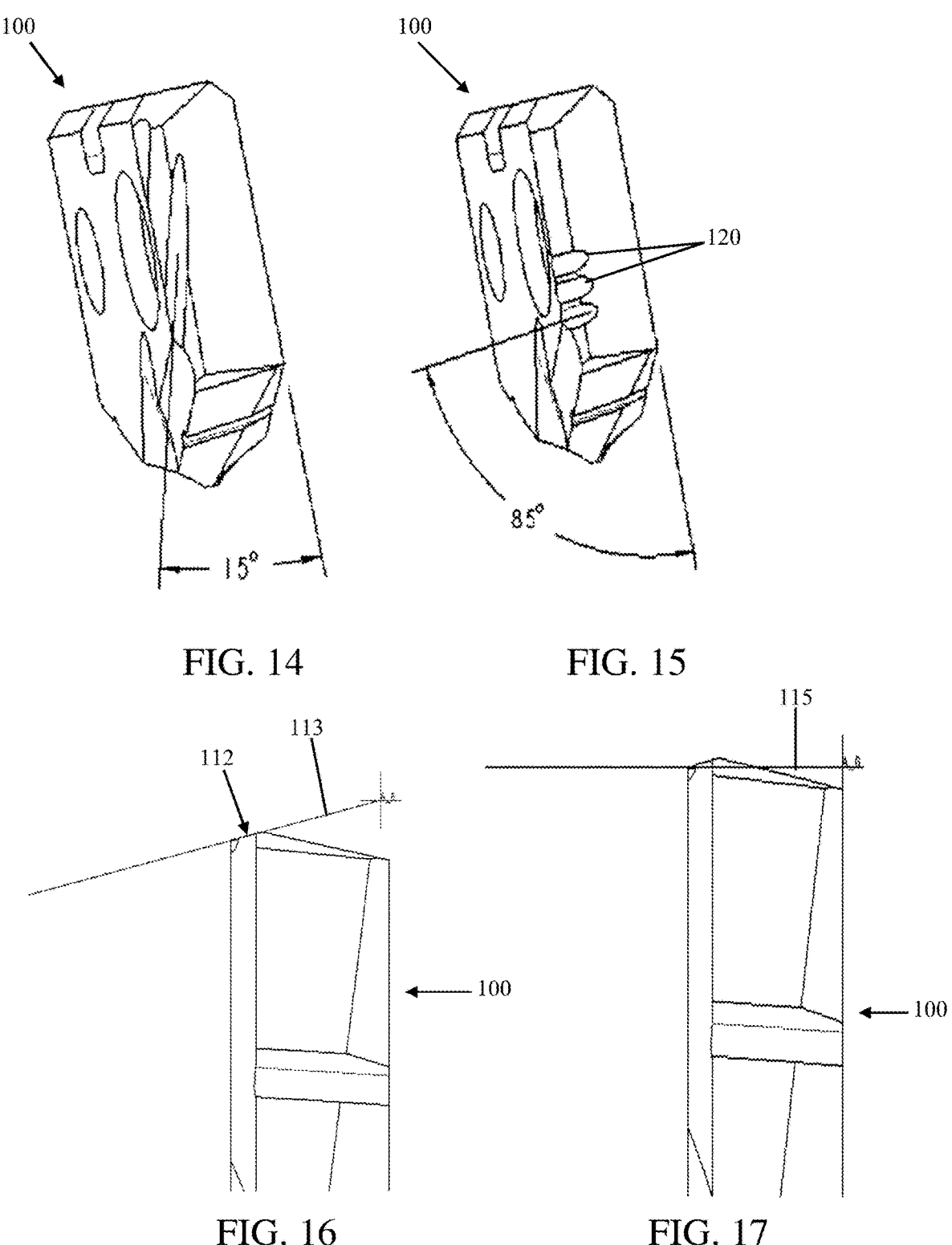
FIGS. 14 and 15 are views showing the orientation of coolant supply channels in examples of a drill insert according to the invention.
FIGS. 16 and 17 are views showing the inclination angle of coolant supply channels in examples of a drill insert according to the invention.

The orientation angle of the coolant supply channels 120 are arranged to facilitate the dispersal of coolant across the interface of margins 112 in a desired manner to minimize friction and heat generation, and flush any materials to prevent adhesion to the surfaces adjacent the interfaces at the outside diameter of the drill insert 100. As seen in the example of FIGS. 4 and 5 for example, the angle of coolant supply channels 120 are inclined about 25° relative to the thickness of the drill insert and plane of the interface or margin 112 from the cutting edges 102 toward the bottom of the drill insert 100. The orientation of coolant supply channels 120 relative to the thickness of the drill insert 100 may be at an acute angle and vary generally between about 15° and less than 90°, as shown in FIGS. 14 and 15 for example. For some applications, an angle of between 20° and 30° has been found to be effective, with the orientation of the coolant supply channels 120 facilitating movement of coolant from the bottom of the hole to the interface, with some directed into and moving through the coolant supply channels 120 to the trailing side of the interface. As an alternative, the coolant supply channels 120 may also be at different orientations relative to one another, to disperse coolant in a desired manner, such as to facilitate targeting a particular area at the interfaces of the drill insert at the outside diameter. The orientation angle may be selected to promote movement of coolant into and through the coolant supply channels 120.

Figure 18:
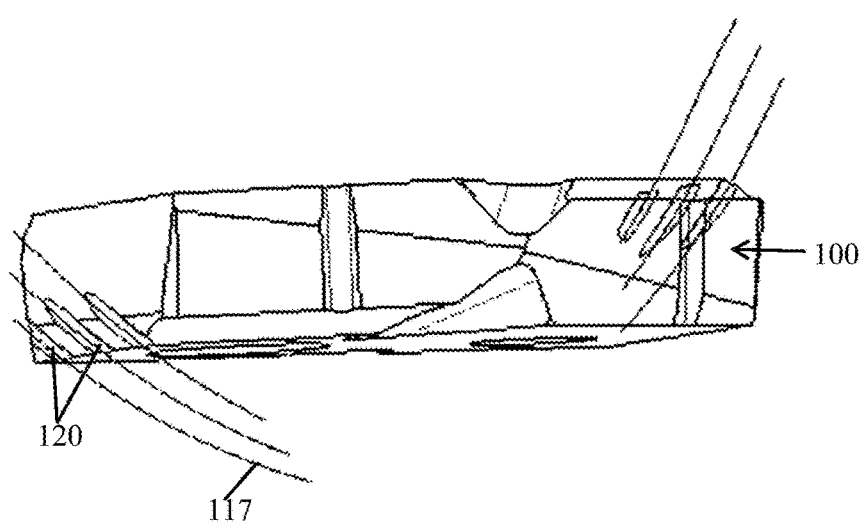
FIG. 18 is a view relating to an alternative coolant supply channel configuration formed in the drill inserts according to the invention.

In this example, the size and position of the coolant supply channels 120 at the interface between the margin 112 and wall of the drilled hole also enable the desired volume of coolant to be dispersed at a desired locations and velocities through the interface boundary. The coolant may be a liquid coolant supplied under pressure of about 1000 psi or more for example, but other pressures may be suitable or preferred depending on the application and materials being machined. The coolant under pressure is thus forced to the area of the interfaces of margins 112, with some flowing through the interface via the one or more coolant supply channels 120. As noted above, the orientation angle of coolant supply channels 120 facilitates control of how the coolant moves between the leading and trailing sides of the interface at the margins 112. The inclination angle of the coolant supply channels 120 in relation to the plane of the interface may also facilitate control and dispersion of coolant at the location of the interfaces. As seen in FIG. 16 for example, the coolant supply channels 120 may be formed at an angle which is substantially tangent or parallel to the interface at margins 112 as shown at 113, to proceed through the interface at approximately the same depth from the leading to the trailing edge of the margins 112. The size of the openings at the leading and/or trailing edge is controlled by the size such as the width and depth of the grooves 120, which may be between 0.002" to 0.025" for example or between 0.005" to 0.10", but may be of different sizes. The margins 112 may be formed at an angle of about 100° measured normal to the centerline of the drill insert 100 for example, such as shown in FIG. 16. Alternatively, as shown in FIG. 17, the coolant supply channels 120 may be formed at an angle which is substantially normal to the centerline of the drill insert 100, which when formed as a groove, increases (or decreases) in depth from the leading to the trailing edge of the margins 112 through the interface as shown at 115. The grooves 120 may also be formed to have a decreasing size, such as depth if formed as a groove, from the leading edge to the trailing edge, which will cause an increase in the pressure or velocity of coolant as it exits the groove or hole. The coolant supply channels 120 may also be formed to have a varying size, such as width and/or depth of a groove, from other coolant supply channels at different locations along the interface. The plurality of coolant supply channels 120 may also have increasing or decreasing size, such as width and/or depth of a groove, as they proceed from the leading edge to the trailing edge of the interface. The coolant supply channels such as grooves 120 may be formed to follow the curvature of the margin surface at the interface if desired. The coolant supply channel inclination angle may be between 60° and 120° relative to the centerline of the drill insert 100 for example, or in many cases a small inclination angle relative to the plane of the interface. The inclination angle may facilitate dispersal and flow of the desired amount and velocity of coolant in the area of the interfaces as desired. To facilitate dispersal of coolant to disrupt adhesion of materials, the openings of coolant supply channels 120 on the trailing edge of the interface cause fringing or spreading of coolant as it exits the coolant supply channel. Different shaped openings on the leading or trailing edges of the interface may be provided, such as widening or flattening to cause coolant to spread out as it exits the coolant supply channels 120. Alternatively, the exit openings of the coolant supply channels 120 may be oriented to direct coolant fluid in a particular manner. Coolant flow diverting structures may be provided in association with the coolant supply channels, such as at the outlet at the trailing side of the interface, to control flow of and dispersion of coolant at the outside diameter of the drill insert, such as to target specific surface areas for example. As a further alternative, as shown in FIG. 18, the coolant supply channels 120 may be curved, such as formed as helical grooves 120, with uniform or varying depth from the leading to the trailing edge of the margins 112 through the interface at margins 112 as shown at 117. Thus, in operation, the formation of the coolant supply channels in relation to the interfaces at the outside diameter can vary to allow desired dispersal and movement of coolant in the different regions of the interfaces.

Figures 19, 20:
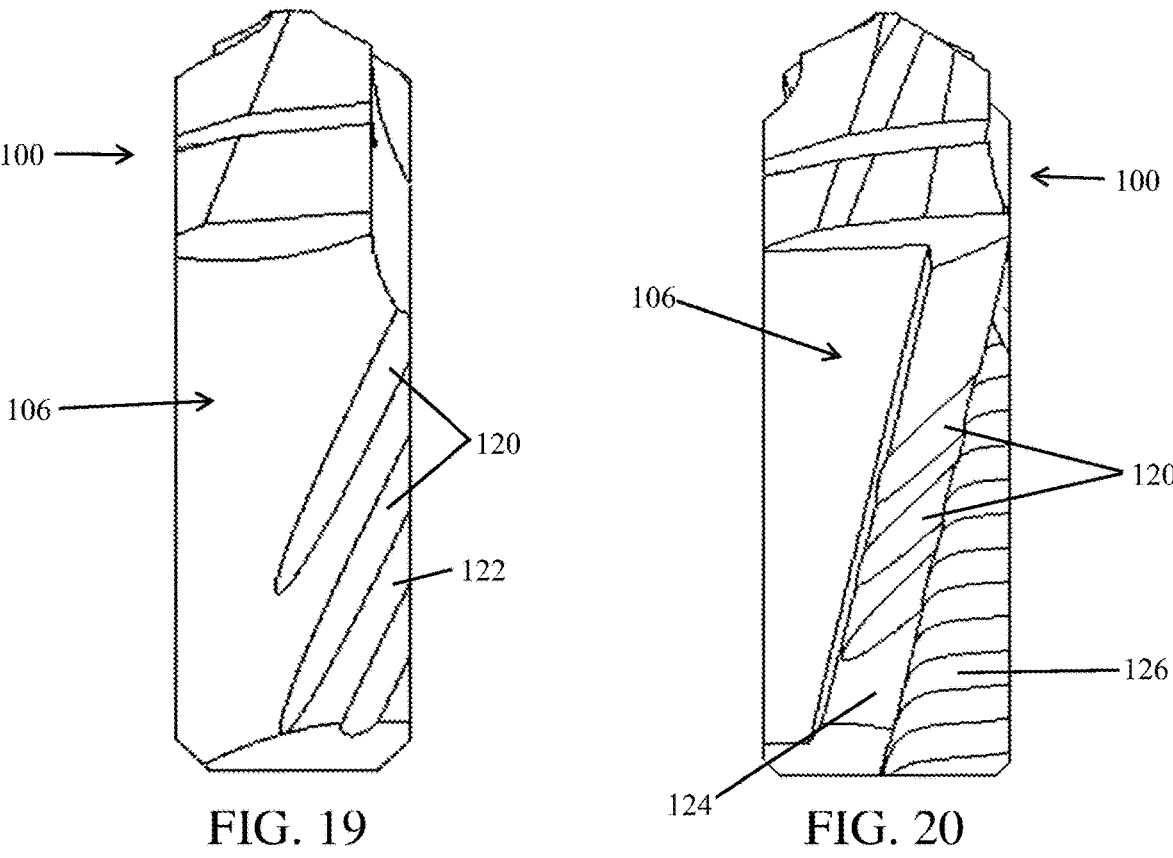
FIGS. 19-21 show views relating to alternative land surface and margin configurations with a plurality of coolant supply channels formed therein in further examples of drill inserts according to the invention.
Figure 21:
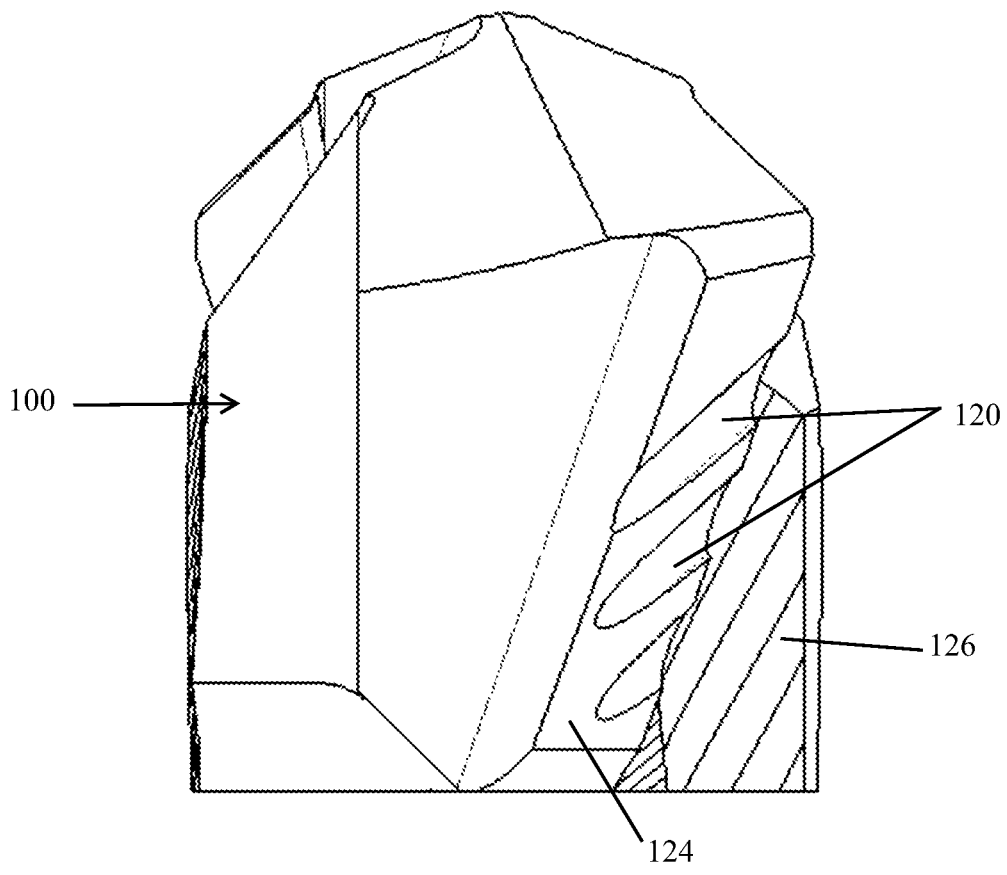

The configuration of the drill insert 100 according to the invention can vary for various applications and materials, and the at least two lands associated with the drill insert may vary similarly, along with the interface with the side of the drilled hole. In other examples, such as shown in FIG. 19, the land 106 of the drill insert 100 may have a cylindrical margin 122 that engages the side of the drilled hole over a portion thereof. The plurality of coolant supply channels 120 are formed to extend from the leading edge to the trailing edge of the interface with the wall of the drilled hole. Alternatively, as seen in FIGS. 20 and 21, the drill insert 100 has curved cutting edges and the lands 106 may be formed to have a helical margin 124 with the plurality of coolant supply channels 120 formed to extend from the leading edge of helical margin 124 to the trailing side of the interface with the wall of the drilled hole created thereby. Other configurations of margins 124 may be used, and it is also possible the drill inserts 120 may employ a plurality of margins that separately interface the wall of the drilled hole on the land surfaces. The plurality of coolant supply channels 120 could be formed to extend from the leading edge to the trailing edge of the interface of the plurality of margins 124 or with respect to each margin 124 if more than one are provided. In these examples, the plurality of coolant supply channels 120 extend from a flute portion 126 formed in the body of drill insert 100 in association with the curved cutting edges, that mates with a flute on the holder to which the drill insert 100 is attached. In relation to the margin configuration and interface with the side of the drilled hole, the plurality of coolant supply channels 120 provide the desired dispersion and movement of coolant at the location of the outside diameter of the drill inserts and interface with the hole as it is drilled, and the variations noted previously may be incorporated into such alternative drill inserts 100.

While this invention has been described with reference to examples thereof, it shall be understood that such description is by way of illustration only and should not be construed as limiting the scope of the claimed invention. Accordingly, the scope and content of the examples are to be defined only by the terms of the following claims. Furthermore, it is understood that the features of any example discussed herein may be combined with one or more features of any one or more examples otherwise discussed or contemplated herein unless otherwise stated.

What is claimed is:

1. A drill insert comprising,
   a drill insert body having a first cutting end opposite a second mounting end, first and second side locating surfaces and a first land surface opposite a second land surface at the outside diameter of the body and a rotational axis,
   the first cutting end of the drill insert body having cutting edges associated therewith, and the first and second side locating surfaces together locating the drill insert body with respect to a drill insert holder,
   a coolant supply to disperse coolant fluid directed at the bottom of the hole and cutting edges of the drill insert body when positioned in the drill insert holder, the first and second land surfaces each forming an interface with the side of a drilled hole over at least a portion thereof, the interfaces having leading and trailing edges, and wherein at least one coolant supply channel extends at a transverse angle toward the second mounting end from the leading edge to the trailing edge of the interfaces to allow coolant fluid to flow through the interfaces and adjacent the trailing edge of the interfaces at the outside diameter of the drill insert body to disrupt the adhesion of cut materials adjacent the trailing edge of the interfaces.

2. The drill insert of claim 1, wherein a plurality of spaced apart coolant supply channels are provided in spaced relation to one another.

3. The drill insert of claim 1, wherein a plurality of coolant supply channels are directed at an orientation angle between the leading and trailing edges with respect to the thickness of the drill insert and plane of the interface and the orientation angle of at least one of the plurality of coolant supply channels is different than the orientation angle of at least one other of the plurality of coolant supply channels.

4. The drill insert of claim 1, wherein the at least one coolant supply channel is directed at an inclination angle with respect to the interfaces.

5. The drill insert of claim 1, wherein a plurality of spaced apart coolant supply channels are provided and the spacing between the plurality of coolant supply channels on each land surface is uniform or non-uniform.

6. The drill insert of claim 1, wherein a plurality of spaced apart coolant supply channels are provided and the same or different number of coolant supply channels are provided on each land surface.

7. The drill insert of claim 1, wherein a plurality of spaced apart coolant supply channels are provided and the spacing between the first of the plurality of coolant supply channels from the cutting edge on each land surface is uniform or non-uniform.

8. The drill insert of claim 1, wherein the coolant supply from the at least one coolant supply channel disrupts the adhesion of cut materials adjacent the trailing edge of the interfaces.

9. The drill insert of claim 1, wherein the at least one coolant supply channel extends through a margin that forms the interface with the wall of a drilled hole on each land surface.

10. The drill insert of claim 1, wherein a plurality of coolant supply channels are formed as grooves that create multiple margin contact areas spaced across the entire margin region of the outside diameter.

11. The drill insert of claim 1, wherein the at least one coolant supply channel has a curved configuration.

12. The drill insert of claim 1, wherein the drill insert body is formed with a flute associated with each cutting edge and the at least one coolant supply channel extends between each flute through the interface.

13. The drill insert of claim 1, wherein a plurality of spaced apart coolant supply channels are provided and formed as grooves wherein the width and/or depth of at least one of the plurality of grooves varies from other grooves and/or between the leading edge to the trailing edge of the interface.

14. The drill insert of claim 1, wherein there is a cutting lip associated with the cutting edges that extends to the outside diameter of the drill insert, and the at least one coolant supply channel is positioned at substantially the interface of the cutting lip at the outside diameter of the drill insert.

15. The drill insert of claim 1, wherein the at least one coolant supply channel is formed as a groove at the interface or hole extending through the drill insert body.

16. A drilling system comprising, a holder having a rotational axis and drill insert mounting end, a shank and coolant delivery outlets, a drill insert formed as a body with bottom, top, first and second side locating surfaces together locating the drill insert body with respect to the holder and land surfaces at the outside diameter, the top including a plurality of cutting edges, wherein the land surfaces each form an interface with the side of a drilled hole over at least a portion thereof, the interfaces having leading and trailing edges, and wherein at least one coolant supply channel extends between the leading and trailing sides of the interfaces at an acute orientation angle with respect to the thickness of the drill insert and plane of the interface from the cutting edges toward the bottom of the drill insert for coolant to enter from the bottom of the drilled hole and be dispersed in the area adjacent the trailing side of the interfaces.

17. A method of dispersing coolant in a drilling operation using a drilling tool comprising a holder having first and second ends and a rotational axis, with a drill insert configured to be fixed in association with the first end and the second end of the holder, and wherein the drill insert includes bottom, top, first and second side locating surfaces together locating the drill insert body with respect to the holder, first and second cutting edges on the top extending from the rotational axis, and first and second land surfaces at the outside diameter of the drill insert with at least a portion of the land surfaces forming an interface with the wall of a drilled hole, wherein at least one coolant supply channel extends through the interfaces from the leading to the trailing edges of the interfaces at a transverse angle toward the second mounting end from the leading edge, and drilling a hole in a workpiece while directing an amount of coolant under pressure toward the bottom of a drilled hole, wherein the at least one coolant supply channel provides coolant to flow through the interfaces and adjacent the trailing edge of the interfaces at the outside diameter of the drill insert.

18. The method of claim 17, wherein the coolant supply from the at least one coolant supply channel disrupts the adhesion of cut materials adjacent the trailing edge of the interfaces.

19. The method of claim 17, wherein the at least one coolant supply is formed as a groove at the interface or hole through the body of the insert extending from the leading side to the trailing side through the interfaces with the hole.

20. The method of claim 17, wherein the interfaces of the insert are formed by at least one margin on the land surfaces of the drill insert and a plurality of spaced apart coolant supply channels are provided which extend between the leading and trailing sides of the at least one margin on each land surface.

* * * * *